(12) United States Patent
Dauber et al.

(10) Patent No.: US 7,727,297 B2
(45) Date of Patent: Jun. 1, 2010

(54) REDUCED FIBER DISK/SHROUD FILTER FOR REMOVING CONTAMINANTS FROM AN ENCLOSURE

(75) Inventors: Edwin Dauber, Chesapeake City, MD (US); Yutaka Sasaki, Okayama (JP)

(73) Assignee: Gore Enterprise Holdings, Inc., Newark, DE (US)

( * ) Notice: Subject to any disclaimer, the term of this patent is extended or adjusted under 35 U.S.C. 154(b) by 1001 days.

(21) Appl. No.: 11/330,007

(22) Filed: Jan. 10, 2006

(65) Prior Publication Data

US 2007/0157588 A1    Jul. 12, 2007

(51) Int. Cl.
*B01D 50/00* (2006.01)
(52) U.S. Cl. .......................... 55/385.6; 55/315; 55/318; 96/15; 96/134; 96/153; 360/97.02
(58) Field of Classification Search ............. 96/134, 96/15, 153; 55/315, 318, 385.6; 360/97.02
See application file for complete search history.

(56) References Cited

U.S. PATENT DOCUMENTS

| | | | |
|---|---|---|---|
| 4,661,255 A * | 4/1987 | Aumann et al. ............. 210/491 |
| 4,902,423 A | 2/1990 | Bacino ................... 210/500.36 |
| 4,985,296 A | 1/1991 | Mortimer, Jr. ............... 428/220 |
| 5,538,545 A | 7/1996 | Dauber et al. |
| 5,639,287 A * | 6/1997 | Van de Graaf et al. ..... 55/385.3 |
| 6,296,691 B1 * | 10/2001 | Gidumal ........................ 96/17 |
| 6,395,073 B1 | 5/2002 | Dauber ........................ 96/134 |
| 6,936,093 B2 | 8/2005 | Isogawa et al. |
| 2004/0112213 A1 * | 6/2004 | Dominiak et al. .............. 95/90 |

FOREIGN PATENT DOCUMENTS

EP    0 395 331 A1    4/1990

* cited by examiner

*Primary Examiner*—Robert J Hill, Jr.
*Assistant Examiner*—Christopher P Jones
(74) *Attorney, Agent, or Firm*—Richard W. Ellis

(57) ABSTRACT

The invention relates to a device for filtering contaminants, such as particulates and vapor phase contaminants, from a confined environment such as electronic or optical devices susceptible to contamination (e.g. computer disk drives) by providing an improved reduced fiber filter.

51 Claims, 6 Drawing Sheets

REDUCED FIBER DISK/SHROUD FILTER FOR REMOVING CONTAMINANTS FROM AN ENCLOSURE

FIELD OF THE INVENTION

This invention relates to a device for filtering contaminants, such as particulates and vapor phase contaminants, from a confined environment such as electronic or optical devices susceptible to contamination (e.g. computer disk drives).

BACKGROUND OF THE INVENTION

Many enclosures that contain sensitive instrumentation must maintain very clean environments in order for the equipment to operate properly. Examples include enclosures with sensitive optical surfaces or electronic connections that are sensitive to particles and gaseous contaminants which can interfere with mechanical, optical, or electrical operation. Other examples include data recording devices such as computer hard disk drives that are sensitive to particles, organic vapors, and corrosive vapors. Still others include enclosures for processing, transporting or storing thin films and semi-conductor wafers. Also included are electronic control boxes such as those used in automobiles and industrial applications that can be sensitive to particles, moisture buildup, and corrosion as well as contamination from fluids and vapors. Contamination in such enclosures originates from both inside and outside the enclosures. For example, in computer hard drives, damage may result from external contaminates as well as from particles and outgassing generated from internal sources. The terms "hard drives" or "hard disk drives" or "disk drives" or "drives" will be used herein for convenience and are understood to include any of the enclosures mentioned above.

One serious contamination-related failure mechanism in computer disk drives is static friction or "stiction". Stiction results from the increased adhesion of a drive head to a disk while the disk is stationary plus increased viscous drag parallel to the head-disk interface. Contaminants on the disk change the surface energy and the adhesive forces between the head and disk; this also causes stiction. Vapors that condense in the gap between the head and disk can cause stiction. High-density disks are more sensitive to contamination-caused stiction because they are smoother and only thin layers of lubricants are present. Further exacerbating these effects are the newer lower energy, lower torque motors being used in smaller disk drives for portable computers and consumer applications.

Another serious contamination-related failure mechanism in computer disk drives is head crashes. Head crashes can occur when particles get into the head disk interface. High density drives may have less than 30 nanometer flying heights or spacing between the head and disk during operation and typically have disks rotating 7200 revolutions per minute or greater. Even submicron-sized particles can be a problem, causing the head to crash into the particle or the disk after flying over a particle, bringing the drive to an abrupt failure mode. Particles can also adversely affect data integrity and mechanical reliability of a drive, sometimes referred to as thermal asperity.

Internal particulate filters, or recirculation filters, are well known. These filters are typically pieces of filter media, such as expanded PTFE membrane laminated to backing material such as a polyester nonwoven, or "pillow-shaped" filters containing electret (i.e., electrostatic) filter media. They may be pressure fit into slots or "C" channels and placed in the active air stream such as near the rotating disks in a computer hard disk drive or in front of a fan in electronic control cabinets, etc. Alternatively, the recirculation filter media can be framed in a plastic frame. In very small drives, these small standup recirculation filters are so very small and the air being circulated by the very small disks is so low, that the filter effectiveness of these filters is minimal at best.

Internal adsorbent filters are also well known. A sorbent filter may be constructed of powdered, granular or beaded sorbent or sorbent mixture encapsulated in an outer expanded PTFE tube. Such a filter is manufactured by W. L. Gore & Associates, Inc., Elkton, Md., and is commercially available under the trademark GORE-SORBER® module. A second well known internal adsorbent assembly incorporates a layer of adsorbent, such as activated carbon/PTFE composite, between an encapsulating filter layer and layer of pressure sensitive adhesive that helps encapsulate the adsorbent as well as provides a means of mounting the adsorbent assembly on an interior wall in the enclosure.

A third internal adsorbent assembly incorporates a layer of adsorbent such as activated carbon/PTFE composite between two layers of filter media or is alternately wrapped in a layer of filter media and can be installed between slots or "C" channels much the way a recirculation filter is installed. These filters have minimal airflow through the filter.

All of these internal adsorbent filters adsorb vapor phase contaminants well, but they do not filter particulates very well. They can collect particles by some impaction of particles onto the filter (i.e., by having the larger particles impacting or colliding with the adsorbent filter as particle-laden air speeds around the filters) or by diffusion of particles onto the filter. However, they do not perform nearly as well as standard recirculation filters that work by a combination of sieving (mechanically capturing particles too large to pass through the pore structure of the filter), impaction (capturing particle too large to follow the bending air streams around filters or the fibers of the filter), interception (capturing particles that tend to follow the air streams, but are large enough to still intercept a filter fiber or in other words those particles with a diameter equal to or less than the distance between the fiber and the air stream line), and diffusion (capturing smaller particles buffeted about by air molecules in a random pattern and coming into contact with a filter fiber to become collected).

A multifunction filter providing a breather filter and a recirculation filter with optional; adsorbents can solve many of the problems associated with the previous filters. A multi-function filter is described in U.S. Pat. No 6,395,073 to Dauber. This is an adequate solution when the space can be found for placing such a combination filter.

Disk or shroud Filters are also known. Such filters are placed under the disk, or in close proximity to its perimeter. Because typically carpet and shroud filters use fibrous media. It is difficult to position this fibrous media very near the computer disk, because the fibers can extend from the filter and contact the computer disk. This may cause more particles to be generated and deposited onto the hard disk, which can lead to a catastrophic failure of the hard drive.

However, the limited space in smaller drives often necessitates that these filters be placed either directly over or under the disks. Moreover, particularly in smaller drives where the disks are very close to the top cover and base plate, these filters can perform better in these locations than in standard upright locations traditionally used in larger drives. In multi-function filters installed within small drives, or within any drive where the clearance between the filter and the drive components is small, fibers protruding from the filter present problems. The clearance between a hard disk and the filter may be less than 0.5 mm and a filter must fit within this thickness as well as leave clearance for the disks to spin without possible contact with the filter.

What is needed is a recirculation filter material with low fiber height to permit the material to be used as a carpet or shroud filter.

Accordingly, the present invention provides a reduced fiber carpet/shroud filter material that can filter the air of particles to prevent fibers from contacting and interfering with any moving parts within the enclosure. The invention also provides a carpet or shroud filter with reduced fiber height.

The invention may optionally include adsorbents to filter gaseous contaminants from the enclosure.

SUMMARY

In one aspect, the invention is a laminated recirculation filter for mounting on an impermeable surface within a disc drive, the laminated recirculation filter comprising an adhesive layer; a filter layer having a first surface adjacent to the adhesive layer and a second surface opposite the first surface, the filter layer comprising a plurality of fibers; and a membrane layer having a first surface laminated to the second surface of the filter layer and a second surface opposite the first surface, wherein the fibers project from the second surface of the membrane layer for an orthogonal distance of less than 0.005 inches.

In another aspect, the invention is laminated recirculation filter for mounting on an impermeable surface within a disc drive, the laminated recirculation filter comprising an adhesive layer; a filter layer having a first surface adjacent to the adhesive layer and a second surface opposite the first surface, the filter layer comprising a plurality of fibers; and a membrane layer having a first surface laminated to the second surface of the filter layer and a second surface opposite the first surface, wherein less than less than 2 fibers per $mm^2$ project for an orthogonal distance of more than 0.010 inches above the second surface of the membrane layer.

In still another aspect, the invention provides an electret recirculation filter for mounting on an impermeable surface within a disc drive, the electret recirculation filter comprising an adhesive layer; and a electret filter layer having a first surface adjacent to the adhesive layer and a second surface opposite the first surface, the electret filter layer comprising a plurality of fibers; wherein the fibers project from the second surface of said electret layer for an orthogonal distance of less than 0.010 inches.

In yet another aspect, the invention includes an electret recirculation filter for mounting on an impermeable surface within a disc drive, the electret recirculation filter comprising an adhesive layer; and an electret filter layer having a first surface adjacent to the adhesive layer and a second surface opposite the first surface, the electret filter layer comprising a plurality of fibers and being less than about 0.005 inches thick; wherein less than less than 2 fibers per $mm^2$ project for an orthogonal distance of more than 0.005 inches above the second surface of the electret filter layer.

In a still further aspect, the invention includes a laminated recirculation filter for mounting on an impermeable surface within a disc drive, the laminated recirculation filter comprising an adhesive layer; a polyester nonwoven filter layer having a first surface adjacent to the adhesive layer and a second surface opposite the first surface, the polyester nonwoven filter layer comprising a plurality of fibers and being less than about 0.005 inches thick; and a membrane layer comprising an ePTFE membrane, the membrane layer having a first surface laminated to the second surface of the polyester nonwoven filter layer and a second surface opposite the first surface, the membrane layer having a thickness of less than about 0.001 inches, wherein the fibers project from the second surface of the membrane layer for an orthogonal distance of less than 0.010 inches.

In a still further aspect, the invention provides a laminated recirculation filter for mounting on an impermeable surface within a disc drive, the laminated recirculation filter comprising an adhesive layer; a polyester nonwoven filter layer having a first surface adjacent to the adhesive layer and a second surface opposite the first surface, the polyester nonwoven filter layer comprising a plurality of fibers and being less than about 0.005 inches thick; and a membrane layer comprising an ePTFE membrane, said membrane layer having a first surface laminated to the second surface of the nonwoven filter layer and a second surface opposite the first surface, the membrane layer having a thickness of less than about 0.001 inches, wherein less than less than 2 fibers per $mm^2$ project for an orthogonal distance of more than 0.005 inches above the second surface of the membrane layer.

BRIEF DESCRIPTION OF THE DRAWINGS

The operation of the present invention should become apparent from the written description when considered in conjunction with the following drawings, in which.

DETAILED DESCRIPTION OF THE INVENTION

Figure 1A:
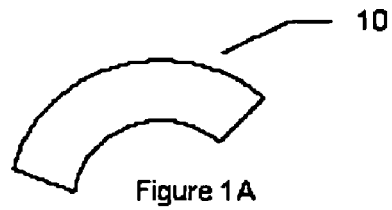
FIGS. 1A and 1B are a top and side view respectively of an embodiment of the filter unit of the present invention with a reduced fiber filter material and adhesive for mounting within an enclosure.

The present invention provides an improved filter media for a disk drive and an improved filter comprising the inventive media. The filter may be used as a shroud or carpet type particle and optionally a particle and vapor filter for filtering internal particles and vapors within a computer hard disk drive. The invention reduces fiber height to prevent fibers from touching moving surfaces such as computer hard disks or heads and prevents such fibers from interfering with the operation of the device into which the filter is installed.

In the latter aspect, the filter includes fibrous filter material, but the filter is constructed such that very few fibers project from the surface of the filter. This allows the filter to have a sufficiently low profile that it can be mounted in small spaces within a disk drive, such as a carpet filter, located beneath the disk, or upon a shroud filter located on a shroud in close proximity to the disk perimeter. This low fiber profile can be accomplished a number of ways: By calendaring the filter media with heat and pressure, fibers are secured within the filter and prevented from extending from the filter surface. Alternatively, by burnishing or treating with a flame or heat process, any extended fibers are melted. In yet another technique, the filter material is treated with adhesives or bonding material and then compressed to bind the fibers within the body of the filter. For instance, this could be accomplished by applying a liquid adhesive before pressing the fibers into the body of the filter.

The reduced fiber filter media may comprise a calendared electrostatic triboelectret material. Useful electrostatic triboelectret materials are available from W. L. Gore and Associates, Inc. under the trademark GORE-TRET® recirculation filters. This media is very efficient (e.g., in excess of 90% @0.3 micron) and also very permeable (e.g., less than 1 mm $H_2O$ at 10.5 fpm or 3.2 m/min). While this media loses its electrostatic charge while being washed with deionized water, it immediately regains its efficiency upon drying due to the triboelectric effect of the mix of dissimilar fibers.

Although this media has many fibrous projections, the inventors have discovered that by calendaring, the electret the fibers can be compressed and bound within the filter media. Surprisingly, calendaring the electret media does not cause significant loss of filter performance. A calendered electret would not be expected to perform as well as a uncalendared material filter because calendaring of the material would be expected to increase the pressure drop through the media, causing more air to bypass the filter and remain unfiltered reducing filtration performance. Moreover, because electrostatic media works by an electric field within the media, or essentially by bending the trajectory of a particle to an oppositely charged fiber, by making the media significantly thinner one would reduce the expected dwell time within the media which would presumably lower the material's collection efficiency.

The electret can be calendared to a desired thickness and fiber height by varying the temperature, pressure and process time of the calendering process. Calendering is a process where heat and pressure are applied to the fibrous material to compress and either heat set the material to reduce thickness or soften or melt a low melt fiber component upon cooling, that component stiffens or solidifies which holds the entire fibrous media at the reduced thickness. Too much heat and pressure will cause the material to lose the fibrous characteristic of the media or to melt the media entirely back to a plastic state. In some cases, excessive calendaring may solidify the fibers to form a plastic sheet. Enough heat and pressure is applied to get to a steady state material of the desired thickness and fiber containment. Too little heat may provide inefficient inter-fiber binding to reduce fiber projection height. In application, the filter may be exposed to higher temperature. This may permit the calendared material to return to its pre-calendared dimensions. The desired heat, pressure and processing time will be material and construction dependent, but is readily determined for any given fibrous filter material.

Although triboelectret materials are preferred, other calendared filter materials can also be used for the improved reduced fiber filtration layer. Such materials could include alternative electret or triboelectret materials that yield high efficiencies and low resistances to airflow. They could also be other non-woven or spun bond materials, filter papers, filter media, filter membranes such as polypropylene membranes or cast polymeric membranes, or some combination of filter materials.

Other processes can also be employed to reduce fiber height. For instance, the electret non-woven media can be burnished or treated with a flame or other heat source that melts protruding fibers back onto the main fiber web. These processes will add enough heat to the protruding fibers to melt them back towards the main web without adding too much heat to melt the entire fibrous material or web. Again temperature and processing time, or the amount of time the heat is applied, will be dependent upon the material composition of the fibers you are melting, but the projecting fibers must reach the melt temperature for the polymer the fiber is composed of. In an alternative technique for reducing fiber height, additives such as adhesives are added to the filter material and run through rollers to compress the material and cured to hold fibers onto the main web. Adhesives that could be used would include thermoset or thermoplastic materials with lower melt temperatures than the fibers of the filter media and then be heat processed to set the thickness and fiber retention. Other adhesives such as liquid adhesives or multipart adhesives could be added to the filter material before or while being compressed and cured as in curing with air, ultraviolet light or other means.

Figure 1B:
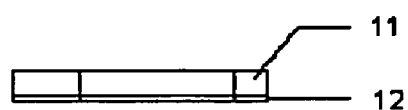

Turning now to the figures, FIGS. 1A and 1B show a top and side view respectively of a first embodiment of the reduced fiber filter 10 of the present invention. FIG. 1B shows a reduced fiber filter media 11 on an adhesive layer 12 for easy mounting onto an enclosure surface. Preferably filter media 11 is a calendared electret media.

Figure 2:
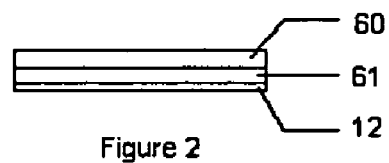
FIG. 2 is a side view of another embodiment of the filter unit of the present invention with a laminated reduced fiber filter comprising a membrane, filter layer and adhesive layer for mounting within an enclosure.

FIG. 2 shows a side view of another embodiment of the laminated reduced fiber filter of the present invention. FIG. 2 shows a membrane 60 laminated to an electret filter layer 61, which is disposed upon adhesive layer 12.

Figure 3:
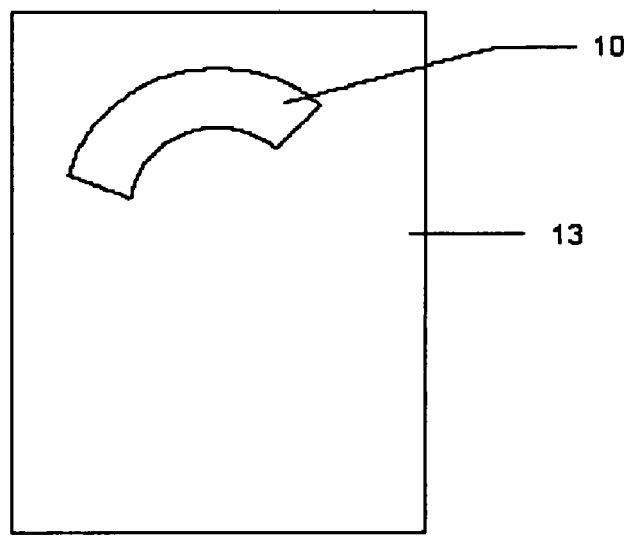
FIG. 3 is a top view of an embodiment of the filter unit of the present invention applied onto an enclosure surface such as the underside of a lid to a computer hard disk drive.

FIG. 3 shows a top view of an embodiment of the improved reduced fiber filter 10 of the present invention as it would be applied to a surface 13 of an enclosure. For example, it is shown as it would be installed as a disk filter 10 to the underside of a cover 13 of a computer hard disk drive.

Figure 4:
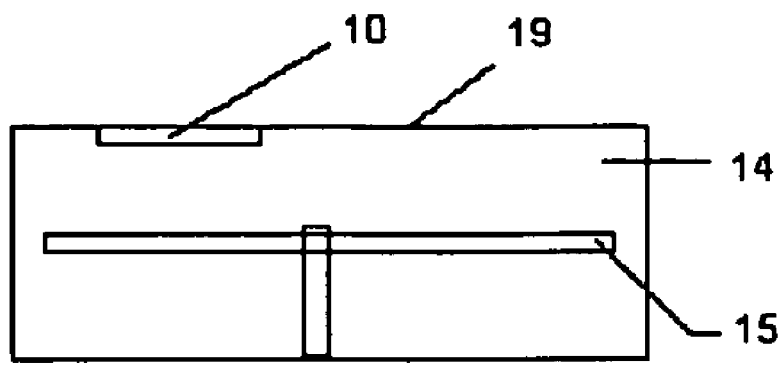
FIG. 4 is a side view of an embodiment of the filter unit of the present invention installed within the top cover of a computer hard disk drive.

FIG. 4 shows a side view of an embodiment of a reduced fiber filter 10 of the present invention as it would be installed as a disk filter on the top cover 19 of a computer hard disk drive 14 with spinning recording media 15.

Figure 5:
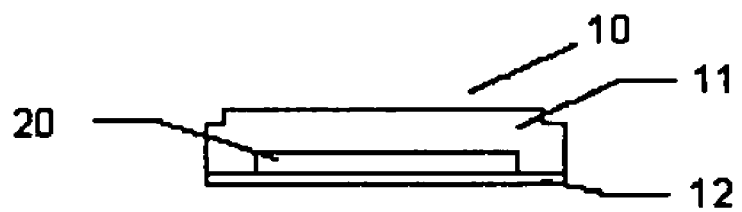
FIG. 5 is a side view of another embodiment of the filter unit of the present invention with an adsorbent layer between an adhesive layer and a filter layer.

FIG. 5 shows a side view of another embodiment of the improved reduced fiber filter of the present invention. In this aspect, a reduced fiber filter layer 11 is placed over an adsorbent layer 20 and both are held in place and together with adhesive layer 12.

Figure 6:
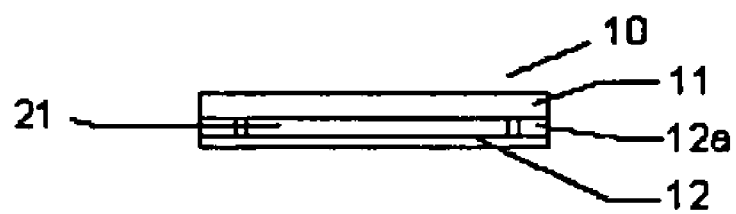
FIG. 6 is a side view of another embodiment of the filter unit of the present invention with an adsorbent layer, and an additional layer with an aperture therein.
Figure 7:
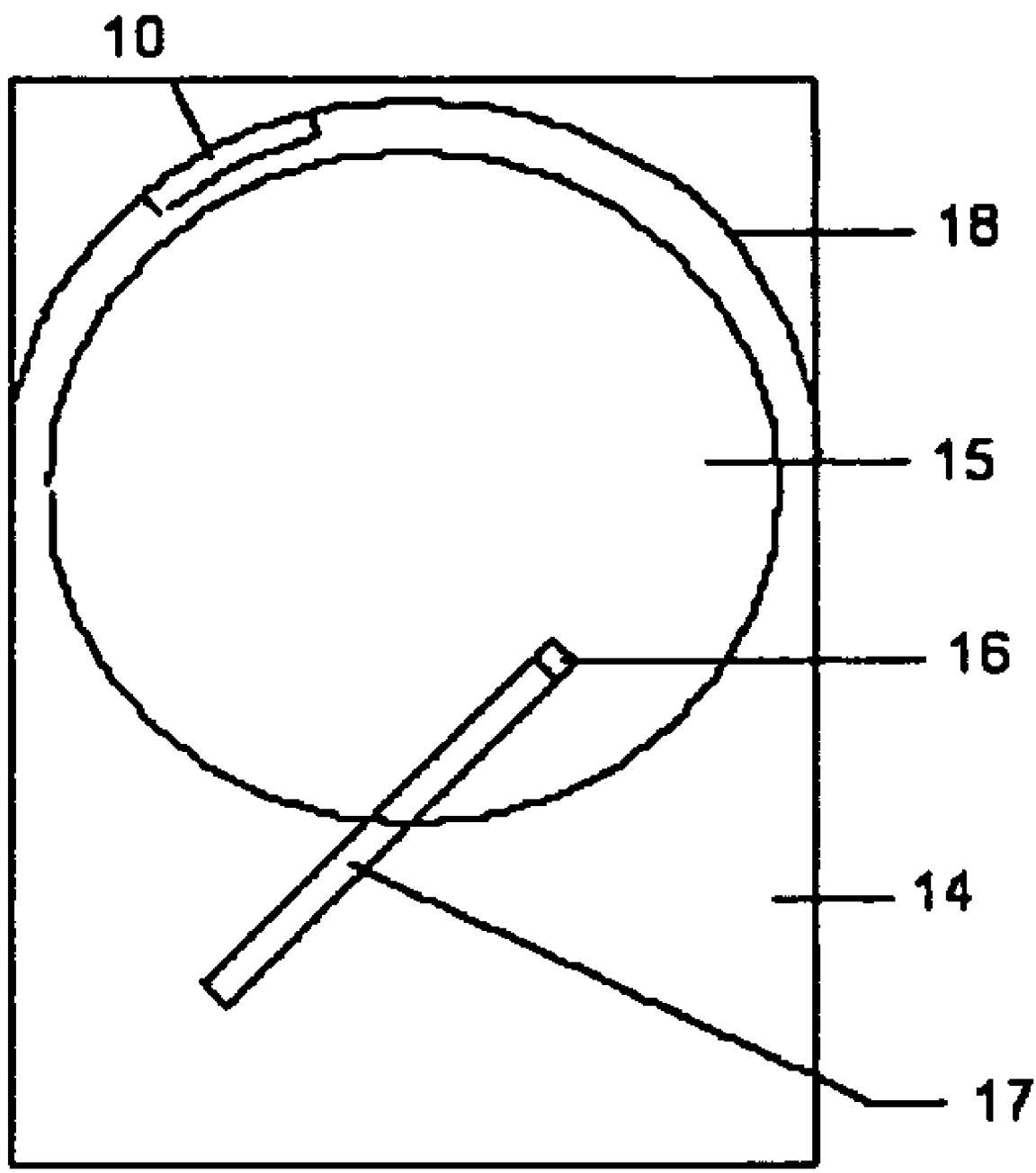
FIG. 7 is a top view of another embodiment of the filter unit of the present invention as it would be applied as a shroud filter to a side wall of a hard disk drive.

FIG. 6 is a side view of another embodiment of the reduced fiber filter 10 of the present invention with an adsorbent layer 21, filter layer 11, and an additional layer with an aperture therein 12a that can be an adhesive and that along with adhesive layer 12 hold the filter together and in place and presents a flat top surface that can be important to reduce any potential turbulence that might be caused by the filter when in place in the Disk Drive;

FIG. 7 shows a top view of an embodiment of the improved reduced fiber filter 10 of the present invention as it would be applied to a surface 18 of an enclosure. In the Figure, it is shown as it would be installed as a shroud filter 10 to a side wall 18 of a computer hard disk drive 14 with spinning recording media 15, recording head 16, and armature 17. In a preferred embodiment, shroud filter 10 would include a pressure sensitive adhesive for easy mounting.

Figure 8:
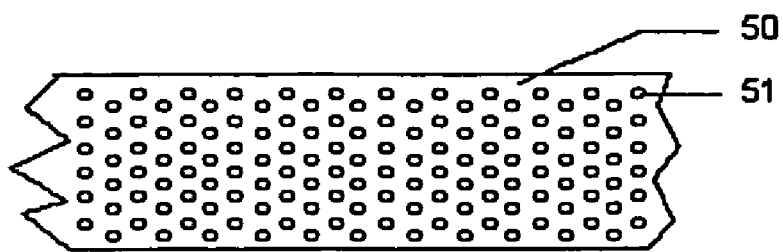
FIG. 8 is a top view of another embodiment of the filter media of the filter unit of the present invention where the filter media has been bonded at various points (often referred to as point bonded) to control extruding fibers.

FIG. 8 shows another embodiment of a filter media with reduced fiber height. In this embodiment, fiber height is reduced by a pattern of point bonding. The figure shows a top view showing a pattern of bonding sites (50) that can be applied to a electret or other fibrous filter material to tie down fibers and try to limit extended fibers. The spacing of bonds is dependent upon a number of factors such as fiber diameter, fiber length, fiber material and the desired fiber tie-down or reduction or protruding fibers desired. Fiber spacing will also impact filter thickness.

Figure 9A:
FIGS. 9A and 9B are side illustrative views of a fibrous filter media before and after calendaring respectively, showing a reduction of fibers protruding from the filter material after calendering.
Figure 9B:
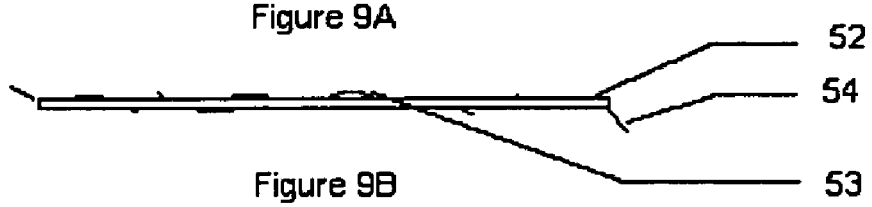

FIGS. 9A and 9B illustrate an electret before and after calendering of a filter material. In FIG. 9A, before calendering, there can be some fibers that have ends 54 pointing out of the surface of the filter 52 as well as fibers 53 that are attached to the surface at each end, but lift in the middle or bow out away from the surface of the filter. After calendaring, as shown in FIG. 9B, the fibers are compressed and bonded or further mechanically intertwined such that they no longer protrude from the surface of the filter.

Figure 11:
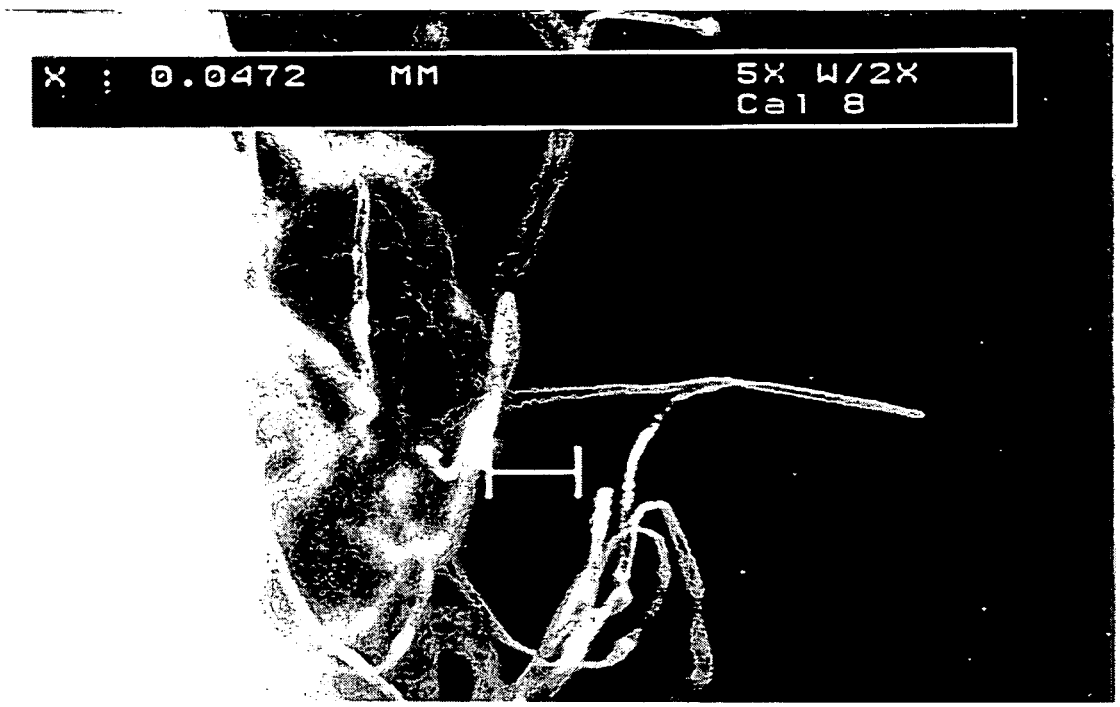
FIG. 11 shows a photomicrograph of the surface of an electret media. The marker is 0.0130 inches showing that fibers extend can normally extend beyond the surface of the filter material by 0.05 inches or more.
Figure 12:
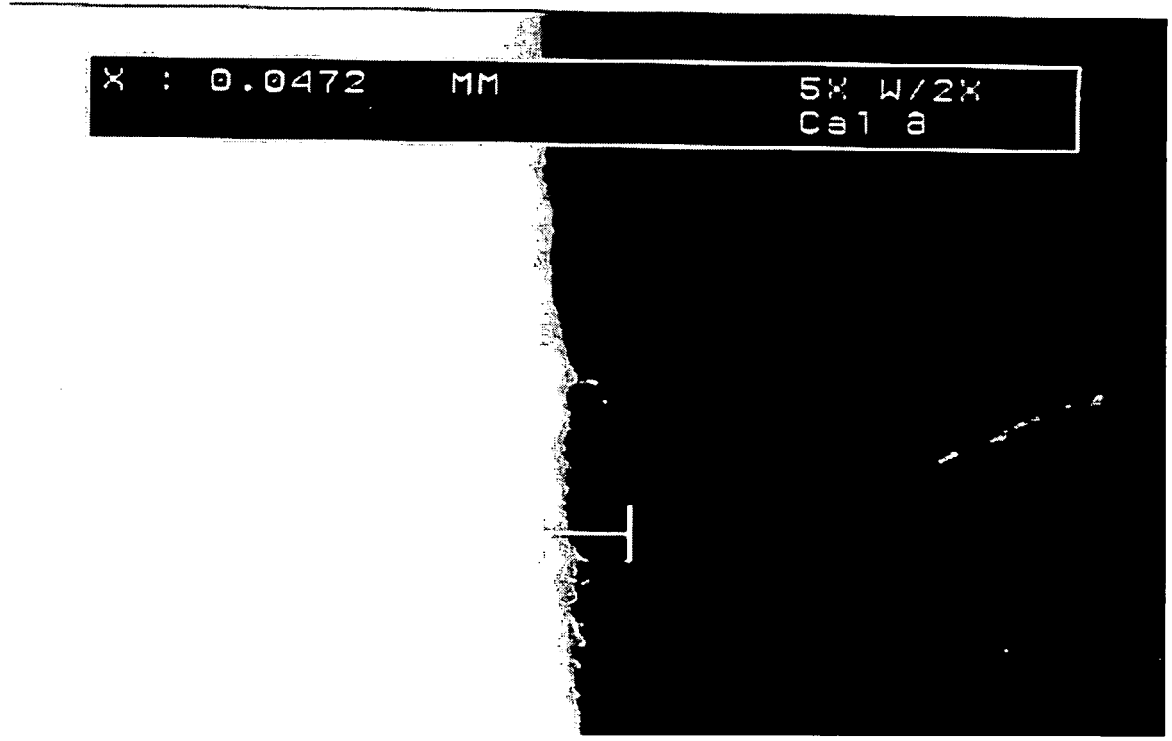
FIG. 12 shows a photomicrograph of the surface of the inventive reduced fiber filter media.

Similarly, FIG. 11 shows a photomicrograph of a standard electret filter material. The photomicrograph includes a reference marker which is 0.013 inches. It can be seen that there are many fibers that extend 0.05 inches or more from the surface of the filter. In contrast, FIG. 12 shows a photomicrograph after the electret has been calendered (like Example 3 of the present invention) and it can be clearly seen that no more than two fiber in the field of view of 3.5 mm come close to extending 0.005 inches from the surface of the filter.

Figure 10A:
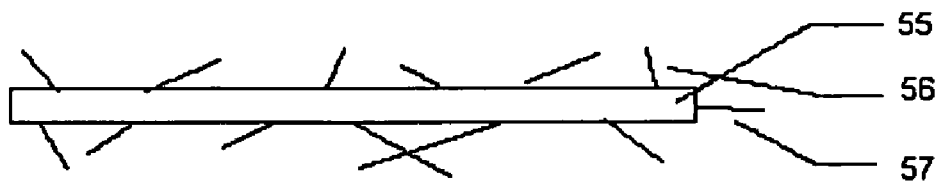
FIGS. 10A and 10B are side illustrative views of a fibrous filter media before and after burnishing respectively, showing how the lengths of protruding fibers have been reduced by melting them back to the base filter media.
Figure 10B:
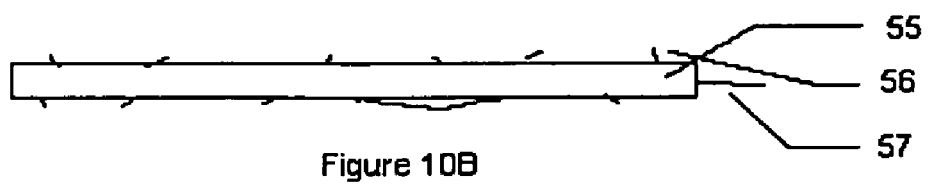

Burnishing may also be used to construct the reduced fiber filter material. FIGS. 10A and 10B show an illustrated before and after burnishing respectively of a filter. In FIG. 10A prior to burnishing fibers 56 and 57 can extend far from the filter surface 55. After burnishing, fibers 56 are melted back to the filter surface for containment. There may be some end fibers 57 that still project from the ends, but typically such fibers cut off during the manufacturing and die cutting of finished filters.

Figure 13:
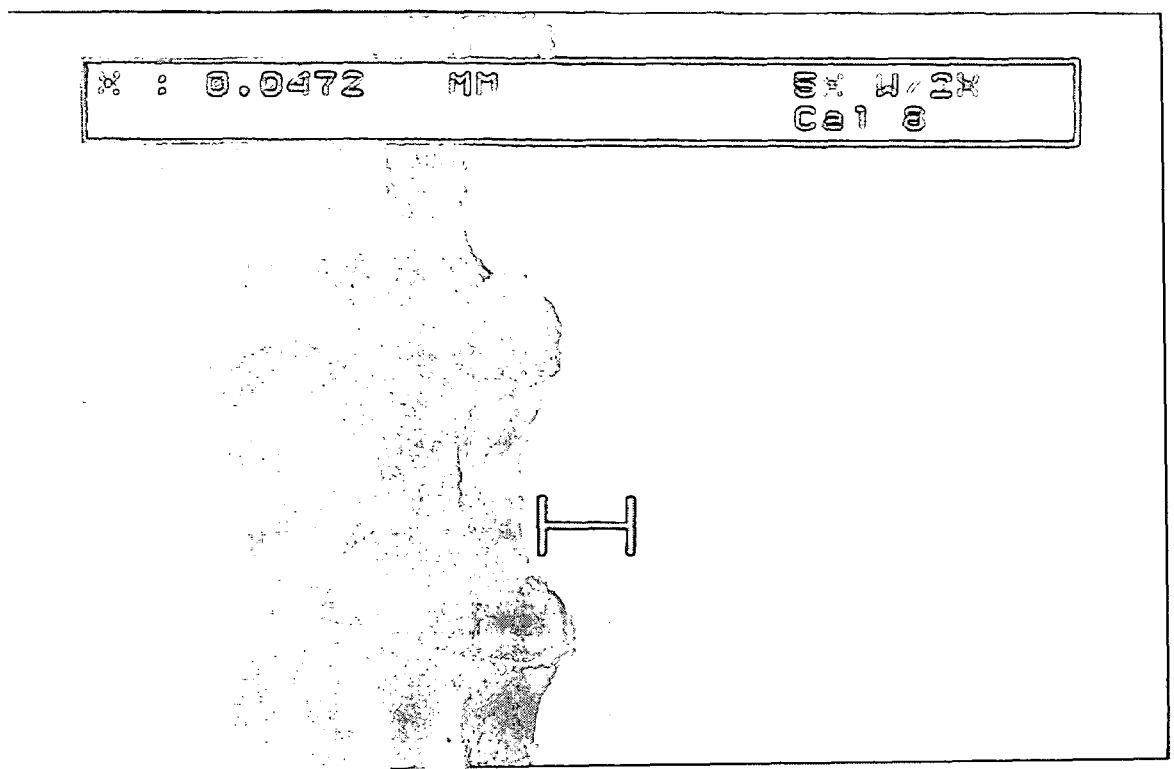
FIG. 13 shows a photomicrograph of the surface of a reduced fiber filter laminate in accordance with the present invention.

FIG. 13 shows a photomicrograph of the surface of another embodiment showing no measurable fibers extending from or through the membrane. In this embodiment another layer (a layer of CONWED polypropylene plastic scrim) was added as an aid for lamination of the membrane to the electret filter. Here the membrane can be seen following the form of the CONWED plastic used in the construction of the filter sample, but no fibers are visible.

Filter material may be either single layer filter or multiple layer filter layered or laminated together. Multiple filter layers may contain membrane layers as they may be preferred for fiber containment and thickness control while adding filtration benefits. Single filter layers would have improved fiber containment via calendaring or other processes to reduce fiber protrusion.

The inventive filters may include a support layer. A preferred support layer or laminate filter layer is a Reemay 2014 polyester nonwoven, 1.0 oz/yd2 available from Reemay, Inc., Old Hickory, Tenn. If a reduced thickness is required, a lighter weight version could be used, or a calendaring of the material can affected either prior to or during any lamination step. Another preferred support layer is a layer of an electrostatic triboelectret material available in finished filter form from W. L. Gore and Associates, Inc. under the trademark GORE-TRET® recirculation filters. Other filter materials can also be used as support layers. They could be alternative electret or other triboelectret materials that yield high efficiencies and low resistances to airflow. They could also be other filter papers or a combination of such filter materials.

An adsorbent layer or layers may be added to any of the embodiments described above, to make a combination filter effective for both particle and vapor filtration. The adsorbent can be treated for the adsorption of specific gaseous species such as acid gasses.

The adsorbent may comprise one or more layers of 100% adsorbent materials, such as granular activated carbon, or may be a filled product matrix such as a scaffold of porous polymeric material compounded with adsorbents that fill some of the void spaces. Other possibilities include adsorbent impregnated nonwovens or beads on a scrim where the nonwoven or scrim may be cellulose or polymeric and may include latex or other binders. Still other possibilities include porous castings or tablets of adsorbents and fillers that are polymeric or ceramic. The adsorbent can also be a mixture of different types of adsorbents.

Examples of adsorbent materials that may be contained within the adsorbent layer include: physisorbers (e.g. silica gel, activated carbon, activated alumina, molecular sieves, adsorbent polymers, etc.); chemisorbers (e.g. potassium permanganate, potassium carbonate, potassium iodide, calcium carbonate, calcium sulfate, sodium carbonate, sodium hydroxide, calcium hydroxide, powdered metals or other reactants for scavenging gas phase contaminants); as well as mixtures of these materials. For some applications, it may be desirable to employ multiple layers of adsorbent materials, with each layer containing different adsorbents to selectively remove different contaminants as they pass through the filter.

A preferred embodiment of the adsorbent layer utilizes an sorbent filled PTFE sheet wherein the sorbent particles are entrapped within the reticular PTFE structure as taught by U.S. Pat. No. 4,985,296 issued to Mortimer, Jr. and specifically incorporated herein by reference. Ideally, particles are packed in a multi-modal (e.g. bi-modal or tri-modal) manner with particles of different sizes interspersed around one another to fill as much of the available void space between particles as is possible, so as to maximize the amount of active material contained in the core. This technique also allows a number of sorbents to be filled into a single layer. The core can then be expanded to allow some airflow or needled to allow more airflow. Expanding the core reduces loading density but offers a more uniform sorbent barrier. Other processing, such as needling or the like, may be desirable to obtain the desired adsorbent and airflow performance. Additionally, ridges or any airflow aiding patterns may be pressed or formed in the adsorbent layer to assist in conditioning or reduction of turbulence of the airflow within the hard disk drive.

The PTFE/adsorbent composite can easily be made in thicknesses from less than 0.001" to 0.400" and greater allowing a great deal of flexibility in finished filter thickness and adsorbent loading. Additionally, sorbent densities approximating 80-95% of full density are possible with multi-model packing and physical compression, so that maximum adsorbent material can be packed per unit volume. The use of PTFE as the binding element also does not block the adsorbent pores as do binders such as acrylics, melted plastic resins, etc.

Additional layers may be added for dimensional stability or added fiber containment. Those can be nonwovens similar to the Reemay 2104 previously described, or they may be any other materials of convenience.

Adhesive layers can be used for convenience in the construction of the filters. The adhesive must have a sufficient peel strength to withstand application use and meet any use specifications that may exist such as high temperature, solvent resistance, regulatory approval, repositionable, or low outgassing specifications. A typical low outgassing specification is to pass ASTM E-595-84 specification of less than 1% total mass loss and 0.1% collected volatile condensable material.

A preferred adhesive is a double sided adhesive comprising of a layer of 0.001" (0.0025 cm) thick permanent acrylic pressure sensitive adhesive applied to both sides of a polymeric film carrier layer. Thicker adhesives may also be used and may be preferred to attach filters onto hard to adhere materials such as a rough enclosure surface.

The polymeric film may be, for example, a polyethylene, polypropylene, polyester, polycarbonate, polyurethane or polyvinyl chloride film. Preferably, the film comprises a polyester film of from 0.0005" thick to 0.005" thick although thicker films could be used if desired. A preferred film is a MYLAR® film manufactured by E. I. Dupont Co.

An adhesive can be disposed on the polymer film by, for example, coating, painting, spraying, dipping, laminating, or otherwise applying the adhesive to the layer. In some embodiments, adhesive may be pre-applied on a commercially available film. In some cases the adhesive may be on a release layer. The release layer is removed prior to filter assembly or installation and an unsupported adhesive remains to be used in the filter construction. This can be especially useful when the filter needs to be very thin such as in new 1.0" and 0.85" drives that may only be up to 3 mm thick including the housing and the recording head and hard disk. A commercially available transfer adhesive is available from 3M, part 9457 and a commercially available double-sided adhesive is 3M 415 which both employ an A-40 acrylic adhesive all commercially available from Minnesota Mining Manufacturing, Inc. of Minneapolis, Minn.

A preferred membrane to use on a laminated construction of the present invention is a membrane layer of expanded PTFE membrane made as described in U.S. Pat. No. 4,902,423 to Bacino et al. This membrane has minimal resistance to airflow yet contains fibers well when laminated to a filter or support layer. Such membranes are available in finished form from W. L. Gore and Associates, Inc. in Elkton Md.

Measurement of Fiber Length From a Filter Surface

Protruding fibers from a filter surface can be seen with an optical microscope such as a Nikon SMZ-2T photo stereo microscope. Protruding fibers can be measured by comparing them to a scale placed in the same field of view. Photomicrographic and measurement systems can be added to the microscope such as a FX photomicrographic system and Video Image Marker Measurement Systems from Nikon Corporation to include length comparators or markers in photomicrographs for length measurement and comparisons.

Assembly of the Device into a Modified Drive

Examples of the present invention were tested for particulate filtration performance using a commercially available 1.0 inch form factor 4 GB disk drive from Hitachi Corporation. Modification consisted of drilling two holes in the drive lid. One hole was used to allow the introduction of contaminants, and another to sample the internal drive atmosphere during the performance testing. Installed over each of the holes in the lid was a stainless steel fitting, the fittings were centered over each hole and attached and sealed using two-component epoxy. Tubing was used to connect the particle supply source to the drive inlet fitting and to connect the particle counter to the outlet fitting. The drive lid was cleaned using isopropanol and clean pressurized air to remove any oils and particles created during modification. Following modification of the drive, the filters were mounted onto the drive lid directly over the hard disk opposite to the side of the disk where the head reads and records data. A comparison was made with the existing stand up recirculation filter as supplied and received in the drive as purchased.

Disk Drive Recirculation Filter Test

This test is designed to measure the effectiveness of a particle filter in reducing the particle concentration inside a disk drive from an initial state in which the drive has been charged with particles. It can be used for standard standup recirculation filters as well as shroud and disk type recirculation filters as described in this invention. The performance of the recirculation filter is quantified in terms of a cleanup time, which is defined as the time required to reduce the particle counts inside the drive to a fixed percentage of their initial value. A typical metric is the time it takes to clean up 90% of the particles in a drive and is referred to as a $t_{90}$ value. Lower $t_{90}$ values indicates faster clean up and improved filter performance.

To test the efficacy of the recirculation filter, the filter samples were tested in the modified disk drive. The existing breather hole in the drive was left uncovered in order to provide a means for venting any overpressure from the drive and to allow air to enter the drive during periods when the drive environment was being sampled without air being purposefully introduced into the drive. The lid was fastened securely to the baseplate. A tube supplying an aerosol of 0.1 μm particles was connected to the inlet port in the drive lid upstream of the filter based on the direction of disk rotation. The particles were 0.1 μm polystyrene latex spheres supplied by Duke Scientific Corporation and they were diluted in deionized water and atomized with an atomizer supplied by TSI Corporation in Minnesota USA. A second tube for sampling the internal atmosphere of the drive connected the laser particle counter (LPC) to the outlet port in the drive lid downstream of the filter. A Model HS-LAS laser aerosol spectrometer from Particle Measuring Systems Inc., in Colorado USA was used to count the particles. Sample flow rate out of the drive and through the counter was maintained by precision mass flow controllers at 0.10 cc/sec and sheath flow through the LPC was maintained at 15 cc/sec. Counts of 0.1 μm particles were obtained once per second by the LPC and stored on a computer disk drive for later analysis. The test was performed with the drive located in a laminar flow hood fitted with a HEPA filter in the air intake, in order to maintain a controlled test environment with an extremely low ambient particle concentration. Samples of a standard sized and construction recirculation filter were used from the drive as purchased. A control containing no recirculation filters was also run.

The recirculation filter test consisted of the following sequence: With the drive turned off and particle laden air passing through the drive, the counts of 0.1 μm particles were monitored until a steady state count was achieved, typically around 2000 counts per second. At that time the drive was turned on while sampling of the internal drive atmosphere continued. The concentration of 0.1 μm particles was again monitored to a steady state condition. The drop in concentration is due to the recirculation of air through the drive and the filter, impaction of the particles on drive surfaces and other particle collection means. Different filter constructions and locations will have different impacts on the steady state recorded when the drive is on and these differences can be analyzed to determine optimal filter constructions and locations.

Data obtained was the counts per second when the drive is turned off labeled as Ca and counts per second when the drive is turned on labeled Css. There will be a no filter Css as well as Css's for every filter tested. A $t_{90}$ is calculated by the following formula: $t_{90}=2.3\ V/Q(1/R_f-1)$ where $t_{90}$ is the calculated time to remove 90% of the particles in seconds, V is the open drive volume or drive air volume, Q is the particle flow rate into the drive (which in this case also equals the sampling rate of the particle counter as the sampling flow was used to pull the particle laden air from the drive to the LPC and from the particle laden source into the drive), and $1/R_f=Ca/Css$.

Three individual tests were performed in order to check reproducibility and eliminate error from noise in the background counts. The results from the three tests were averaged to obtain the average cleanup times for 0.1 μm particles. Further analysis can calculate a RCUR time by dividing the $t_{90}$ time of the filter by the $t_{90}$ time of the no filter run to get a number referred to as the RCUR number or Relative Clean-Up Ratio. The RCUR number is a better comparative number between different drives and different test setups because it references a filter performance to a no filter performance in a particular drive being tested.

A 1.0" computer hard disk drive was modified as stated above for testing particle cleanup in a modified drive where inlet and outlet ports were mounted to the lid of the hard drive. The samples were tested in accordance to the procedures previously outlined. Each sample was tested in a different 1.0" drive, but they were all from Hitachi Corporation in Japan. There is variability in the absolute times from drive to drive in these tests. Part of that variability may come from drive leakage as these drives are often not perfectly sealed and can become even less sealed after opening and closing them to insert filters and to locate the ports on the drive lid. But the Relative Clean-Up Ratio compares each filter as tested to a no filter test for that particular drive and test setup and as such removes much of the drive to drive variability.

Without intending to limit the scope of the present invention, the following examples illustrate how the present invention may be made and used.

EXAMPLE 1

Samples were constructed and the recirculation filter effectiveness of the improved reduced fiber recirculation filter was evaluated. The sample filter consisted of an PTFE membrane with a Frazier number of around 200F as manufactured by W. L Gore and Associates as described in U.S. Pat. No. 4,902, 423, laminated to a calendared 2.0 oz/yd2 Reemay nonwoven polyester available from BBA Fiberweb Inc., in Old Hickory Tenn. to contain fibers. Total laminate thickness was about 0.015".

The sample filter was then cut from this material in the shape of a semicircle to fit under the disk but around any motor mount interference. A 0.006" double sided adhesive supplied by Adhesive's research in Glenn Rock Pa. was placed under the non-woven polyester layer to complete the filter assembly. A no filter test was run as a control. The filters were tested using the Disk Drive Recirculation Filter Test described above. The results are reported in Table 1.

TABLE 1

|  | Absolute clean up time $T_{90}$ [secs] | Relative Clean up Ratio, RCUR |
|---|---|---|
| No filter Condition | 11.7 |  |
| Example 1 | 5.8 | 0.49 |

EXAMPLE 2

Samples were made up to test the recirculation filter efficacy of another improved reduced fiber recirculation filter. The exemplary inventive filter consisted of an ePTFE membrane with a Frazier number of around 200 F used in Example 1 laminated to a 70 gm/m2 electret filter material as supplied by W. L. Gore and Associates. The original thickness of the electret and membrane is about 0.052"+/−0.010". The layers were laminated together utilizing a T-shirt press manufactured by Geo Knight and Company in Brockton Mass. Conditions used for this sample was healing the top platen to 340 F (171 C) and utilizing 90 PSI air pressure to the platen and holding the set for 30 seconds. The laminate was then further compressed by inverting the sample and reheating it with the same temp and pressure for seven seconds. Final laminate thickness was about 0.017". A filter was then cut from this laminate again and attached to a disk drive utilizing a 0.006" thick double sided acrylic pressure sensitive adhesive from Adhesive's Research. A no filter test was also run as a control and the standard stand-up filter as supplied in the drive was also tested. The results are reported in Table 2. Further examination of the surface of the sample is shown in FIG. 13 which can be compared to a standard electret filter from FIG. 11.

TABLE 2

|  | Absolute clean up time $t_{90}$ [secs] | Relative Clean up Ratio, RCUR |
|---|---|---|
| No filter Condition | 25.4 |  |
| Standard Recirculation Filter | 24.8 | 0.98 |
| Example 2 | 4.0 | 0.16 |

EXAMPLE 3

Another embodiment of reduced fiber recirculation filter was constructed and compared to the standard filter was the standard stand up filter for the drive as supplied and purchased. The exemplary inventive filter sample consisted of a layer of 30 gm/m2 electret purchased from Hollingsworth and Vose Company in East Walpole Mass. The electret had an original thickness of 0.032"+/−0.010". The material was calendered using the same T-shirt press as used in Example 2 above but without membrane. The electret was placed between two high temperature nonstick sheets. The conditions used to calender the material, was 300 F (149 C) on the top platen, with 60 PSI air pressure supplied to the machine and held for 20 seconds. A final thickness of 0.0115" was obtained. A filter was cut from the material again utilizing a 0.004" thick double sided acrylic pressure sensitive adhesive from Adhesive's Research. A no filter test was run as a control. The standard stand-up filter as supplied in the drive was also tested. The results are reported in Table 3. Further examination of the surface of the filter is shown in FIG. 12 which can be compared to a standard electret filter in FIG. 11.

TABLE 3

|  | Absolute clean up time $t_{90}$ [secs] | Relative Clean up Ratio, RCUR |
|---|---|---|
| No filter Condition | 42.9 |  |
| Standard Recirc Filter | 38.0 | 0.89 |
| Example 2 | 12.8 | 0.30 |

While particular embodiments of the present invention have been illustrated and described herein, the present invention should not be limited to such illustrations and descriptions. It should be apparent that changes and modifications may be incorporated and embodied as part of the present invention within the scope of the following claims:

We claim:

1. A laminated recirculation filter for mounting on an impermeable surface within a disc drive, the laminated recirculation filter comprising:
   a) an adhesive layer;
   b) a filter layer having a first surface disposed upon the adhesive layer and a second surface opposite the first surface, said filter layer comprising a plurality of fibers; and
   c) a membrane layer for restraining the fibers of the filter layer, the membrane layer having a first surface disposed upon the second surface of said filter layer and a second surface opposite the first surface, such that fibers of the filter layer penetrate the membrane and project from the second surface of said membrane layer for an orthogonal distance of less than 0.015 inches.

2. The laminated recirculation filter of claim 1, in which said membrane layer is ePTFE.

3. The laminated recirculation filter of claim 1, in which said filter layer is an electret filter layer.

4. The laminated recirculation filter of claim 3, in which said electret filter layer is less than about 0.015 inches thick.

5. The laminated recirculation filter of claim 3 in which said electret filter layer is less than about 0.010 inches thick.

6. The laminated recirculation filter of claim 1, in which said filter layer comprises a nonwoven filter layer.

7. The laminated recirculation filter of claim 6, in which said nonwoven filter layer is less than about 0.015 inches thick.

8. The laminated recirculation filter of claim 6, in which said nonwoven filter layer is less than about 0.010 inches thick.

9. The laminated recirculation filter of claim 1, wherein the fibers penetrating the membrane project from the second surface of said membrane layer for an orthogonal distance of less than 0.010 inches 10. The laminated recirculation filter of claim 1, wherein the fibers penetrating the membrane project from the second surface of said membrane layer for an orthogonal distance of less than 0.005 inches.

11. A laminated recirculation filter for mounting on an impermeable surface within a disc drive, the laminated recirculation filter comprising:
   a) an adhesive layer;
   b) a filter layer having a first surface disposed upon the adhesive layer and a second surface opposite the first surface, said filter layer comprising a plurality of fibers; and
   c) a membrane layer for restraining the fibers of the filter layer, the membrane layer having a first surface disposed upon the second surface of said filter layer and a second surface opposite the first surface such that fibers of the filter layer penetrate the membrane and, wherein less than 2 fibers per $mm^2$ penetrate said membrane layer and project for an orthogonal distance of more than 0.015 inches above the second surface of said membrane layer.

12. The laminated recirculation filter of claim 11, in which said membrane layer is ePTFE.

13. The laminated recirculation filter of claim 11, in which said filter layer is an electret filter layer.

14. The laminated recirculation filter of claim 13, in which said electret filter layer is less than about 0.015 inches thick.

15. The laminated recirculation filter of claim 13, in which said electret filter layer is less than about 0.010 inches thick.

16. The laminated recirculation filter of claim 11, in which said filter layer comprises a nonwoven filter layer.

17. The laminated recirculation filter of claim 16, in which said nonwoven filter layer is less than about 0.015 inches thick.

18. The laminated recirculation filter of claim 16, in which said nonwoven filter layer is less than about 0.010 inches thick.

19. The laminated recirculation filter of claim 11 wherein less than 2 fibers per $mm^2$ project for an orthogonal distance of more than 0.010 inches above the second surface of said membrane layer.

20. The laminated recirculation filter of claim 11 wherein less than 2 fibers per $mm^2$ project for an orthogonal distance of more than 0.005 inches above the second surface of said membrane layer.

21. An electret recirculation filter for mounting on an impermeable surface within a disc drive, the electret recirculation filter comprising:
   a) an adhesive layer; and
   b) a electret filter layer having a first surface disposed upon the adhesive layer and a second surface opposite the first surface, said electret filter layer comprising a plurality of fibers; wherein at least some of the fibers are bonded together such that the fibers project from the second surface of said electret layer for an orthogonal distance of less than 0.015 inches.

22. The electret recirculation filter of claim 21, in which the electret filter layer is less than about 0.015 inches thick.

23. The electret recirculation filter of claim 21, in which the electret filter layer is less than about 0.010 inches thick.

24. The electret recirculation filter of claim 21 wherein the fibers project from the second surface of said electret layer an orthogonal distance of less than 0.010 inches.

25. The electret recirculation filter of claim 21 wherein the fibers project from the second surface of said electret layer an orthogonal distance of less than 0.05 inches.

26. The electret recirculation filter of claim 21 wherein the electret has been calendered such that at least some of the fibers are bonded together.

27. The electret recirculation filter of claim 21 wherein some of the fibers of the electret have been point bonded to other fibers at discrete points on the filter layer.

28. The electret recirculation filter of claim 21 wherein the electret is burnished such that some of the fibers are bonded together.

29. An electret recirculation filter for mounting on an impermeable surface within a disc drive, the electret filter comprising:
   a) an adhesive layer; and
   b) an electret filter layer having a first surface disposed upon the adhesive layer and a second surface opposite the first surface, said electret filter layer comprising a plurality of fibers; wherein said fibers are bonded together such that less than 2 fibers per mm$^2$ project for an orthogonal distance of more than 0.015 inches above the second surface of said electret filter layer.

30. The electret recirculation filter of claim 29, in which said electret filter layer is less than about 0.010 inches thick.

31. The electret recirculation filter of claim 29 wherein said fibers are bonded together such that less than 2 fibers per mm$^2$ project for an orthogonal distance on more than 0.010 inches above the second surface of said electret layer.

32. The electret recirculation filter of claim 29 wherein less than 2 fibers per mm$^2$ project for an orthogonal distance on more than 0.005 inches above the second surface of said electret layer.

33. The electret recirculation filter of claim 29 wherein the electret has been calendered such that at least some of the fibers are bonded together.

34. The electret recirculation filter of claim 29 wherein some of the fibers of the electret has been bonded or point bonded at discrete points on the filter layer.

35. The electret recirculation filter of claim 29 wherein the electret has been burnished.

36. A laminated recirculation filter for mounting on an impermeable surface within a disc drive, the laminated recirculation filter comprising:
   a) an adhesive layer;
   b) an electret filter layer having a first surface disposed upon the adhesive layer and a second surface opposite the first surface, said filter layer comprising a plurality of fibers; and wherein at least some of the fibers are bonded together such that the fibers project from the second surface of said filter layer for an orthogonal distance of less than 0.015 inches.

37. A laminated recirculation filter of claim 36 wherein the fibers project from the second surface of said electret filter layer for an orthogonal distance of less than 0.010 inches.

38. A laminated recirculation filter of claim 36 wherein the fibers project from the second surface of said electret filter layer for an orthogonal distance of less than 0.005 inches.

39. A laminated recirculation filter of claim 36 further comprising an adsorbent layer between the adhesive layer and the electret filter layer.

40. A laminated recirculation filter of claim 39, wherein the adsorbent layer is a physisorber made from a material selected from the group consisting of silica gel, activated carbon, activated alumina, molecular sieves, clays and superadsorbent fibers.

41. A laminated recirculation filter of claim 39, wherein the adsorbent layer is a chemisorber made from a material selected from the group consisting of calcium carbonate, calcium sulfate, potassium permanganate, sodium carbonate, potassium carbonate, sodium phosphate and activated metals.

42. A laminated recirculation filter of claim 39, wherein the adsorbent layer is a polymeric scaffold that is impregnated with an adsorbent.

43. A laminated recirculation filter of claim 42, wherein the scaffold is expanded polytetrafluoroethylene.

44. A laminated recirculation filter for mounting on an impermeable surface within a disc drive, the laminated recirculation filter comprising:
   a) an adhesive layer;
   b) a filter layer having a first surface disposed upon the adhesive layer and a second surface opposite the first surface, said filter layer comprising a plurality of fibers; and
   c) a membrane layer for restraining the fibers of the filter layer, the membrane layer having a first surface disposed upon the second surface of said filter layer and a second surface opposite the first surface, such that fibers of the filter layer penetrate the membrane;
and wherein less than 2 fibers per mm$^2$ project for an orthogonal distance of more than 0.015 inches above the second surface of said filter layer.

45. A laminated recirculation filter of claim 44 wherein less than 2 fibers per mm$^2$ penetrate through the membrane and project for an orthogonal distance of less than 0.010 inches above the second surface of said filter layer.

46. A laminated recirculation filter of claim 44 wherein less than 2 fibers per mm$^2$ penetrate through the membrane and project for an orthogonal distance of less than 0.005 inches above the second surface of said filter layer.

47. A laminated recirculation filter of claim 44 further comprising an adsorbent layer between the adhesive layer and filter layer.

48. A recirculation filter of claim 47, wherein the adsorbent layer is a physisorber made from a material selected from the group consisting of silica gel, activated carbon, activated alumina, molecular sieves, clays and superadsorbent fibers.

49. A recirculation filter of claim 47, wherein the adsorbent layer is a chemisorber made from a material selected from the group consisting of calcium carbonate, calcium sulfate, potassium permanganate, sodium carbonate, potassium carbonate, sodium phosphate and activated metals.

50. A recirculation filter of claim 47, wherein the adsorbent layer is a polymeric scaffold that is impregnated with an adsorbent.

51. A recirculation filter of claim 50, wherein the scaffold is expanded polytetrafluoroethylene.

* * * * *

UNITED STATES PATENT AND TRADEMARK OFFICE
CERTIFICATE OF CORRECTION

| | | |
|---|---|---|
| PATENT NO. | : 7,727,297 B2 | Page 1 of 1 |
| APPLICATION NO. | : 11/330007 | |
| DATED | : June 1, 2010 | |
| INVENTOR(S) | : Dauber et al. | |

It is certified that error appears in the above-identified patent and that said Letters Patent is hereby corrected as shown below:

At column 12, line 34, change "healing" to --heating--; see specification as originally filed at page 24, line 9.

Signed and Sealed this
Nineteenth Day of July, 2011

David J. Kappos
*Director of the United States Patent and Trademark Office*